(12) United States Patent
Cath et al.

(10) Patent No.: US 8,029,671 B2
(45) Date of Patent: Oct. 4, 2011

(54) COMBINED MEMBRANE-DISTILLATION-FORWARD-OSMOSIS SYSTEMS AND METHODS OF USE

(75) Inventors: Tzahi Y. Cath, Golden, CO (US); Amy E. Childress, Reno, NV (US); Christopher R. Martinetti, Reno, NV (US)

(73) Assignee: Board of Regents of the Nevada System of Higher Education, on Behalf of the University of Nevada, Reno, Reno, NV (US)

( * ) Notice: Subject to any disclaimer, the term of this patent is extended or adjusted under 35 U.S.C. 154(b) by 289 days.

(21) Appl. No.: 12/303,318

(22) PCT Filed: Jun. 13, 2007

(86) PCT No.: PCT/US2007/071141
§ 371 (c)(1),
(2), (4) Date: Dec. 3, 2008

(87) PCT Pub. No.: WO2007/147013
PCT Pub. Date: Dec. 21, 2007

(65) Prior Publication Data
US 2010/0224476 A1   Sep. 9, 2010

Related U.S. Application Data

(60) Provisional application No. 60/804,648, filed on Jun. 13, 2006.

(51) Int. Cl.
*B01D 63/08* (2006.01)
*B01D 63/02* (2006.01)
*B01D 61/36* (2006.01)
*B01D 61/00* (2006.01)

(52) U.S. Cl. ......... 210/321.64; 210/321.72; 210/321.75; 210/652

(58) Field of Classification Search ........................ None
See application file for complete search history.

(56) References Cited

U.S. PATENT DOCUMENTS
3,130,156 A   4/1964   Neff
(Continued)

FOREIGN PATENT DOCUMENTS
WO   02060825   8/2002
(Continued)

OTHER PUBLICATIONS

Bradbury, "Water Filters Rely on Nanotech," pp. 1-3 downloaded from http://www.wired.com/print/science/discoveries/news/2004/10/65287 on Jul. 3, 2007.

(Continued)

*Primary Examiner* — Krishnan S Menon
(74) *Attorney, Agent, or Firm* — Klarquist Sparkman, LLP

(57) ABSTRACT

In some embodiments, systems and methods are provided for purifying a liquid, such as an impaired water. In some examples, seawater or brackish water is purified, such as to a potable level. Some configurations provide a system which includes a membrane-distillation unit, such as a vacuum-enhanced direct contact membrane distillation unit. The system also includes a forward-osmosis system, which may include one or more forward-osmosis units. A concentrated draw stream from the membrane-distillation unit, such as a concentrated brine solution, serves as a draw solution for a forward-osmosis unit, which may extract water from a source water, such as an impaired water. In some implementations, the forward-osmosis system includes a second forward-osmosis unit which uses the diluted draw solution from the first forward-osmosis unit as a draw solution to extract water from a source water. The system may include additional components, such as a heater or a buffer tank.

5 Claims, 4 Drawing Sheets

U.S. PATENT DOCUMENTS

| | | | |
|---|---|---|---|
| 3,532,621 | A | 10/1970 | Thomas |
| 3,906,250 | A | 9/1975 | Loeb |
| 4,875,980 | A | 10/1989 | Arita et al. |
| 5,098,575 | A | 3/1992 | Yaeli |
| 5,755,102 | A | 5/1998 | Assaf et al. |
| 6,185,940 | B1 | 2/2001 | Prueitt |
| 6,299,777 | B1 | 10/2001 | Bowser |
| 6,391,205 | B1 | 5/2002 | McGinnis |
| 6,645,380 | B2 | 11/2003 | Baig et al. |
| 6,656,361 | B1 * | 12/2003 | Herron et al. .............. 210/640 |
| 6,849,184 | B1 | 2/2005 | Lampi et al. |
| 7,608,188 | B2 | 10/2009 | Cath |
| 2006/0011544 | A1 * | 1/2006 | Sharma et al. .............. 210/640 |
| 2006/0144789 | A1 * | 7/2006 | Cath et al. .............. 210/641 |
| 2006/0237366 | A1 * | 10/2006 | Al-Mayahi .............. 210/644 |

FOREIGN PATENT DOCUMENTS

| | | |
|---|---|---|
| WO | 2005012185 | 2/2005 |
| WO | 2005017352 | 2/2005 |
| WO | 2005120688 | 12/2005 |
| WO | 2006120399 | 11/2006 |

OTHER PUBLICATIONS

Cath, et al., "Experimental Study of Desalination Using Direct Contact membrane Distillation: a New Approach to Flux Enhancement," Journal of Membrane Science 228:1-16 (2004).

Cath, et al. "Forward Osmosis: Principles, applications, and Recent Developments," Journal of Membrane Science 281:70-87 (2006).

Cath, et al., "Membrane Contactor Processes for Wastewater Reclamation in Space Part I. Direct Osmotic Concentration as Pretreatment for Reverse Osmosis," Journal of Membrane Science 257:85-98 (2005).

Cath, et al., "Membrane Contactor Processes for Wastewater Reclamation in Space Part II. Combined Direct Osmosis, Osmotic Distillation, and Membrane Distillation for Treatment of Metabolic Wastewater," Journal of Membrane Science 257:111-119 (2005).

Cath, Office Action Response regarding U.S. Appl. No. 11/293,407, filed (Aug. 18, 2008).

Cath, Office Action Response regarding U.S. Appl. No. 11/293,407 (Jan. 26, 2009).

Cath, Office Action Response regarding U.S. Appl. No. 11/293,407 (Jul. 10, 2009).

Cath, Office Action Response regarding U.S. Appl. No. 11/295,807 (Aug. 18, 2008).

Cath, Office Action Response regarding U.S. Appl. No. 11/295,807 (Dec. 2, 2008).

Cath, Office Action Response regarding U.S. Appl. No. 11/295,807 (Dec. 19, 2008).

Cath, Appeal Brief regarding U.S. Appl. No. 11/295,807 (Aug. 19, 2009).

Cath, Appeal Brief regarding U.S. Appl. No. 11/295,807 (Oct. 15, 2009.

"Crossing Boundaries in Pursuit of Future Solutions," Sweden Today, p. 37, No. 2, 2006; filed dated Aug. 7, 2006.

Giorgini; International Search Report from PCT/GB2004/003450; Sep. 22, 2004.

Goers; International Search Report from PCT/GB2004/003242; Oct. 18, 2004.

Liu and Martin, "Applying Membrane Distillation in High-Purity Water Production for Semiconductor Industry," Royal Institute of Technology Presentation, KTH, Stockholm, Sep. 30, 2005.

Liu, "Polygeneration of Electricity, Heat, and Ultra Pure Water for Semiconductor Industry," file created Apr. 23, 2003.

McCutcheon, et al., "A Novel Ammonia-Carbon Dioxide Forward (Direct) Osmosis Desaliniation Process," Desalination 174:1-11 (2005).

Menon, Office Action regarding U.S. Appl. No. 11/293,407 (Mar. 17, 2008).

Menon, Office Action regarding U.S. Appl. No. 11/293,407 (Sep. 26, 2008).

Menon, Office Action regarding U.S. Appl. No. 11/293,407 (Feb. 10, 2009).

Menon, Office Action regarding U.S. Appl. No. 11/295,807 (Mar. 18, 2008).

Menon, Office Action regarding U.S. Appl. No. 11/295,807 (Oct. 2, 2008).

Menon, Advisory Action regarding U.S. Appl. No. 11/295,807 (Dec. 10, 2008).

Menon, Office Action regarding U.S. Appl. No. 11/295,807 (Dec. 29, 2008).

Menon, Office Action regarding U.S. Appl. No. 11/295,807 (Nov. 18, 2009).

Menon, Interview Summary regarding U.S. Appl. No. 11/295,807 (Jan. 20, 2010).

Mootz; International Search Report from PCT/GB2005/002307; Aug. 24, 2005.

Pankratz, Water Desalination Report, vol. 43, No. 23, 4pp., Jun. 18, 2007.

Park; Written Opinion and International Search Report from PCT/US2007/071141; Nov. 5, 2007.

Reports and Articles summary page, downloaded from http://www.xzero.se/en/reports.html; dated Aug. 14, 2006.

Schofield et al., "Factors Affecting Flux in Membrane Distillation," Desalination 77:279-294 (1990).

Schofield et al., "Gas and Vapour Transport Through Microporous Membranes. II. Membrane Distillation," Journal of Membrane Science 53:173-185 (1990).

Tillberg, "ZLD Systems—An Overview," presented at the Royal Institute of Technology, KTH, Stockholm, 2004; file dated Dec. 19, 2005.

XZero Company Brochure, file dated Jun. 5, 2006.

International Preliminary Report on Patentability and Written Opinion of the International Searching Authority, mailed Dec. 31, 2008, for corresponding International Application No. PCT/US2007/071141, 8 pages.

* cited by examiner

COMBINED MEMBRANE-DISTILLATION-FORWARD-OSMOSIS SYSTEMS AND METHODS OF USE

CROSS REFERENCE TO RELATED APPLICATIONS

This is the U.S. National Stage of International Application No. PCT/US2007/071141, filed Jun. 13, 2007, which was published in English under PCT Article 21(2), which in turn claims the benefit of U.S. Provisional Application No. 60/804,648, filed Jun. 13, 2006. Each of these applications is incorporated by reference herein in its entirety.

FIELD

This disclosure pertains to liquid-treatment apparatus and methods. Particular embodiments provide such methods and apparatus as usable for producing potable or otherwise cleaned (and hence useful) water from a source of non-portable or otherwise impaired water or any aqueous solution.

BACKGROUND

As the demand for water has grown, industry has long sought processes for the desalination of salt water, such as seawater or brackish water. Some processes that have been used to desalinate water are distillation and membrane processes, such as reverse osmosis, nanofiltration, and electrodialysis.

Water recovery is a major economic parameter of drinking water production. However, this parameter is typically limited in existing processes. In addition to limited water recovery, another drawback is that these processes are typically considered energy intensive. Membrane based systems can suffer from additional problems. For example, membrane fouling and scaling in pressure-driven membrane processes (e.g., in reverse osmosis and nanofiltration) are often a major area of concern, as they can increase the cost of operating and maintaining the systems. Pretreatment of the feed water is a way of reducing fouling and scaling, but it can be complex due to variation in raw water quality, environmental impacts, and cost. An additional drawback of most membrane-based systems is that increased salt content of the feed stream typically reduces the flux of product water due to the high osmotic potential difference between the feed solution and the permeate.

Seawater desalination has become a common practice to supply the growing demand for water in areas having access to the sea. Shortage of potable (drinking) water in inland areas pose much more complicated challenges to water authorities, governments, and other stakeholders. Inland regions are typically restricted to the use of already overly allocated surface water and groundwater.

In addition, many desalination process are very sophisticated, costly, and energy intensive. These technologies may be infeasible for developing countries, which thus may lack sufficient access to safe drinking water supplies.

SUMMARY

Embodiments of the present disclosure provide combined membrane-distillation/forward-osmosis systems and methods for purifying a liquid, such as reducing its solute or suspended solids load. In particular implementations, the liquid to be purified is one or more of seawater, brackish-water, impaired-water, wastewater, or other source (generally referred to as source water). In a particular example, the liquid to be treated is urine. In a further example, the liquid to be purified is blowdown water from cooling towers or other cooling systems. In further implementations, the source water is purified to a potable level or to high-quality industrial water for boilers or for the electronics industry. In further examples, the methods and systems of the present disclosure are used for purification of domestic and/or industrial wastewater, concentration of foods or beverages, and concentration or purification of chemical or pharmaceutical products. In addition, although the disclosed processes and systems are generally described for purifying and extracting water, they may find use in purifying and extracting liquid other than water, such as extracting a solvent from a mixed solvent system or a solvent from its solutes.

In one aspect, systems are provided for purifying a liquid, such as source water. In one embodiment, the system includes a water purification unit, such as a desalination unit, in combination with an upstream, in at least some implementations parallel, forward-osmosis water purification unit that dilutes an intermediate brine stream (or "draw solution") entering the desalination unit. In a particular implementation, the desalination unit is a membrane-distillation unit. The forward-osmosis purification unit is configured to receive a stream of relatively impure source water (such as contaminated water or water having high salinity) on its feed side.

In operation, source water flows on the receiving side of a forward-osmosis semipermeable membrane. The feed water for the forward-osmosis system may come from, for example, a waste water, seawater, an impaired water, or an industrial aqueous solution to be separated or concentrated (e.g., a food stuff, a chemical solution, a biological solution, or a pharmaceutical solution). Concurrently, an intermediate stream (draw solution) of liquid having a relatively high osmotic pressure (e.g., a liquid having a higher osmotic pressure compared to the source water, including concentrated salt solutions or seawater or brackish water) flows on the permeate side of the forward-osmosis semipermeable membrane. This results in a net transfer of water through the membrane from low osmolality liquid stream to the intermediate brine stream, thereby diluting the brine stream. In some examples, the draw solution is concentrated brine from the membrane-distillation unit. The resulting diluted brine stream is used as a feed for the desalination unit. By diluting the feed stream entering the desalination unit, the energy expenditure (per unit of product water) of the desalination unit can be reduced.

In operation, feed water, such as from a forward-osmosis system, enters the membrane-distillation unit. A stream of permeate water, such as potable or fresh water, is circulated on a permeate side of a distillation membrane. The feed water, typically at a temperature higher than the permeate stream, is circulated on the feed side of the membrane in the membrane-distillation water purification unit. Product water is collected and the concentrated feed stream leaving the feed side of the membrane is fed to the forward-osmosis system, where it may be used as a draw solution. The forward-osmosis system dilutes the concentrated feed stream and acts as a pretreatment step for additional feed water to the desalination unit.

In more specific examples, the forward-osmosis system includes multiple forward-osmosis processes, such as forward-osmosis of seawater or brackish water followed by forward-osmosis of wastewater to further dilute the feed to the desalination unit.

In particular implementations, a combined membrane-distillation/forward-osmosis system includes a concentrated feed solution buffer tank, such as a brine buffer tank. In some examples, the brine buffer tank is hydraulically intermediate the downstream forward-osmosis system and the membrane-distillation unit. The buffer tank allows the concentration (i.e., osmolality) of the intermediate brine stream (draw solution) to the forward-osmosis system, such as a concentrated brine, to be adjusted. For example, the concentration can be adjusted by adding or releasing concentrated brine to or from the buffer tank. The volume of brine in the tank increases or decreases as these adjustments are made. Such adjustment can be useful due to different flux rates between the membrane-distillation and forward-osmosis processes.

In a particular implementation of a combined membrane-distillation/forward-osmosis system according to the present disclosure, the desalination unit is a membrane-distillation process and the intermediate brine (draw solution, from the one or more forward-osmosis units) is heated before entering the desalination unit. In particular implementations the heat is supplied by an electrical or a combustion source. In further implementations the source of heat is a heat exchanger fed by waste heat or by solar collectors. In yet further implementations, the source of heat is a heat-pump, or plurality of heat pumps, returning the heat from the concentrated raw water stream or final product water to the intermediate brine stream.

In further configurations, the system includes a purification loop intermediate the desalination unit and a downstream forward-osmosis system, such as a desalination process that can provide a higher water recovery than reverse osmosis. In a specific implementation, the desalination process is a membrane-distillation loop situated parallel to the forward-osmosis loop. The membrane-distillation desalination loop can extract product water from the intermediate brine stream. The membrane-distillation desalination loop includes a membrane-distillation unit that produces a product-water stream and maintains or elevates the concentration of the intermediate brine stream; thereby providing increased overall water recovery from the system and enhancing the efficiency of the parallel forward-osmosis system. In particular examples, the membrane-distillation desalination loop operates using a traditional or a vacuum enhanced membrane-distillation process.

In a more particular implementation, the membrane-distillation purification loop is an enhanced membrane-distillation purification loop including an enhanced membrane-distillation device exhibiting relatively high flux across a membrane in the distillation device. In a particular implementation, the enhanced membrane-distillation device includes a vacuum enhanced direct contact membrane-distillation device. In the device, vacuum may be applied to the permeate side, and optionally the feed side, of a flow cell containing the membrane in order to cause the stream to flow under vacuum or reduced pressure and enhance the flux of liquid vapor across the membrane.

In further embodiments, the disclosed systems include an energy-recovery system, such as energy recovery system situated downstream from the membrane-distillation unit. The energy-recovery system can be, for example, a heat-exchanger if the water purification unit is a thermal-water purification device, such as membrane-distillation. In a particular implementation, the energy-recovery system can be any of various other energy-extracting devices that extract usable energy from liquid passing through it. In a further implementation, the energy-recovery system is a combination of multiple energy-extracting devices as required or desired. Energy from the recovery system is used, in some examples, to heat the feed stream entering the membrane-distillation unit.

In certain implementations of the disclosed system, the coupled forward-osmosis and membrane-distillation units can be configured as a two-stage (or multi-stage) system including a first-stage unit and a second-stage unit connected in tandem. In a particular implementation, each of the combined units includes a semipermeable membrane/s and a hydrophobic microporous membrane/s configured in parallel. In particular examples, the first-stage and second stage forward-osmosis unit perform forward-osmosis of the raw source water, such as seawater, brackish water, or other source of impaired water.

In further implementations, the second-stage forward-osmosis unit performs forward-osmosis of the output of the first-stage forward-osmosis unit against the intermediate brine stream. The output of the second-stage forward-osmosis unit is concentrated source water and is a waste stream for disposal or it can be processed for beneficial reuse. The intermediate brine stream leaving the second-stage is the brine feed to the first-stage.

In further embodiments, the present disclosure provides a combined forward-osmosis and membrane-distillation unit, such as a one cell design. For example, a one-cell design may include a feed solution separated from a draw solution by a forward-osmosis membrane. The draw solution is also separated from a permeate stream by a membrane-distillation membrane. The system may include heaters, coolers, and draw-solution buffer tanks, as described herein.

In certain examples, the one-cell design includes a plurality of forward-osmosis and membrane-distillation membranes. In a particular example, the one-cell water purification unit is configured as alternating pairs of forward-osmosis and membrane-distillation membranes. Feed water is circulated on feed sides, in between each pair of forward-osmosis membranes. Permeate water is circulated on permeate sides, in between each pair of membrane-distillation membranes. Draw solution is circulated between forward-osmosis and membrane-distillation membranes, on feed sides of the membrane-distillation membranes and draw solution sides of the forward-osmosis membranes.

In another flow-cell example, the flow-cell is configured as a cylindrical shell defining a cavity. Draw solution is passed through the cylindrical shell. A plurality of cylindrical forward-osmosis membranes and membrane-distillation membranes are disposed in the cavity. Feed solution is passed through a bore side of the forward-osmosis membrane and permeate water is passed through a bore side of the membrane-distillation membrane. Intermediate draw solution flows in the space between the forward-osmosis and membrane-distillation membranes.

The use of a forward-osmosis purification unit may be advantageous compared to other purification techniques, such as reverse osmosis, because forward-osmosis membranes may be less susceptible to fouling. Furthermore, the reduced susceptibility to membrane fouling may reduce the need to pre-treat the feed stream for the forward-osmosis purification unit. Moreover, certain draw solutions such as ammonium bicarbonate, sulfur dioxide, or potassium nitrate, at high but producible concentrations, have osmotic pressures much higher than that of seawater—potentially resulting in a high recovery or flux of water.

Because the solute from the draw solutions (intermediate brine stream) may cross the forward-osmosis membrane and enter the raw source water stream, downstream treatments may be used to recover the solute for reuse in the draw solutions. For example, the previously described membrane-distillation loop or an electrodialysis process utilizing regular ion exchange or mosaic membranes may be used to remove the solute, which can then be returned to a re-concentrating unit, if desired.

Embodiments of the present disclosure may be advantageous when a water to be purified, such as urine, is complex, such as containing both organic compounds and inorganic salts, or mixtures of such compounds or salts having different chemical or physical properties. The differing purification systems, such as the membrane-distillation purification unit and the forward-osmosis system, may be used to remove different components of the complex input stream. For example, a membrane-distillation water purification unit may be useful for removing organic compounds, such as urea, that pass through forward-osmosis membranes. The forward-osmosis system can be used to remove other components, such as inorganic compounds and organic compounds that do not cross the forward-osmosis membrane. In particular examples, the forward-osmosis system reduces fouling of the membrane-distillation membrane. This embodiment is also advantageous because, unlike forward-osmosis, membrane-distillation is relatively insensitive to the salt concentration of the feed stream, and thus, in certain examples, the draw solution of a forward-osmosis system can be used as a feed stream in a membrane-distillation process.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. A particular embodiment need not provide all features noted above, nor solve all problems or address all issues in the background noted above.

BRIEF DESCRIPTION OF THE DRAWINGS

Various embodiments are shown and described in connection with the following drawings in which.

DETAILED DESCRIPTION

Figure 1:
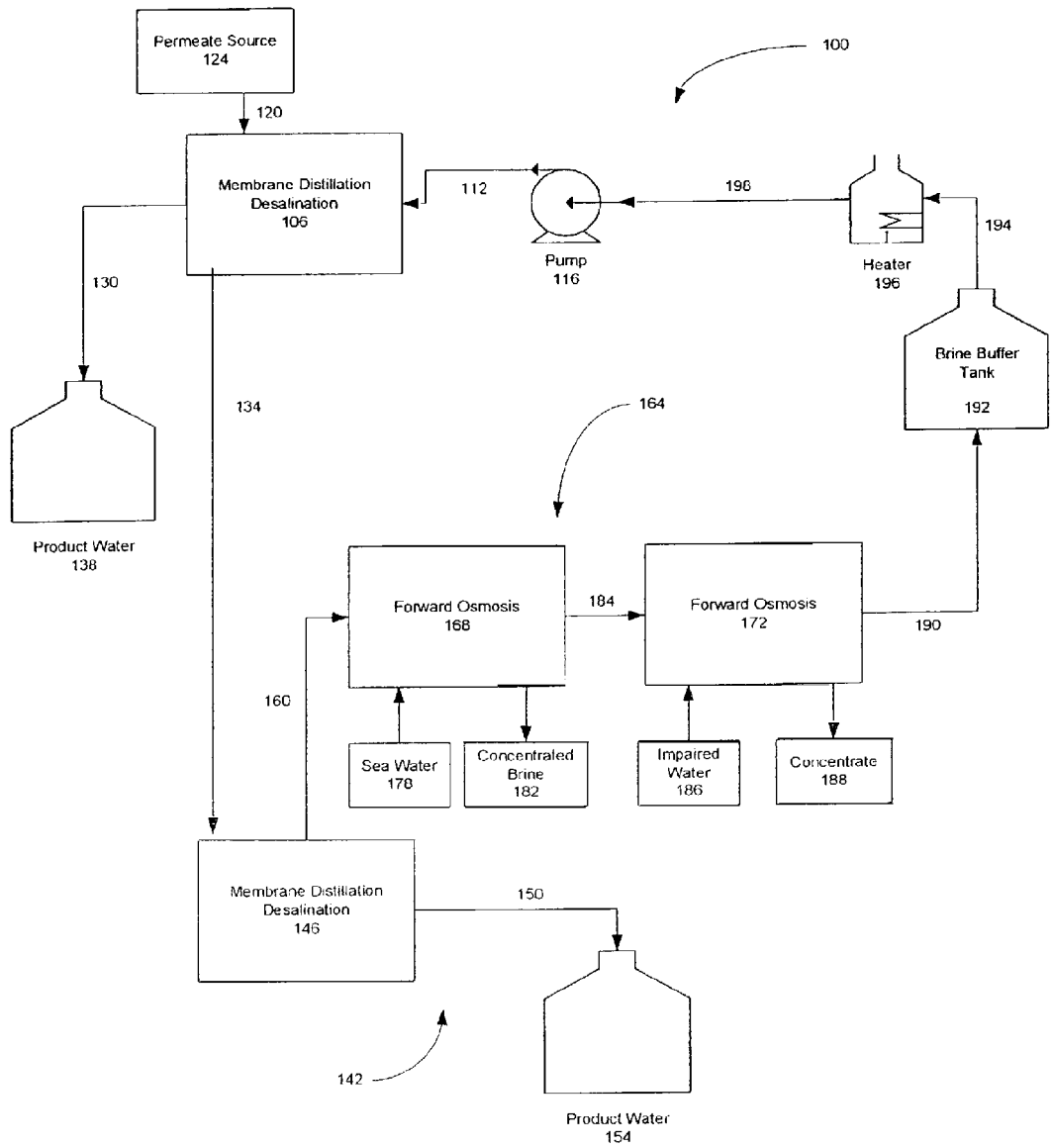
FIG. 1 is a schematic hydraulic diagram of a water-treatment system according to an embodiment of the present disclosure.

Unless otherwise explained, all technical and scientific terms used herein have the same meaning as commonly understood by one of ordinary skill in the art to which this disclosure belongs. In case of any such conflict, or a conflict between the present disclosure and any document referred to herein, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end values (unless specifically excluded) and intermediate ranges.

Although methods and materials similar or equivalent to those described herein can be used in the practice or testing of the present disclosure, suitable methods and materials are described herein. The disclosed materials, methods, and examples are illustrative only and not intended to be limiting.

Terms

The following terms are used herein:

"Wastewater" is water that has been used in a manner or subject to a condition in which the water has acquired a load of contaminants and/or waste products that render the water incapable of at least certain desired practical uses without being subject to reclamation.

"Seawater" (abbreviated "SW") is saline water from the sea or from any source of brackish water.

"Feed water" is water, such as seawater, input to a treatment process such as a desalination process.

"Seawater pretreatment" is a treatment of seawater by one or more processes, such as, but not limited to, coagulation, filtration, ion-exchange, disinfection, and any other membrane process, in the stated order or any other order.

"Treated Wastewater" (abbreviated "Treated WW") is reclaimed wastewater that has been subjected to a secondary or tertiary wastewater-treatment process.

"Concentrated Treated Wastewater" (abbreviated "Concentrated Treated WW") is a treated wastewater after water has been extracted from it, such as by an forward-osmosis process; thus, concentrated treated wastewater typically has a higher concentration of solutes and/or other non-water waste products than treated wastewater.

"Impaired Water" is any water that does not meet a specified numeric or narrative criteria in a water quality standard, or that is not suitable for a designated use.

"Concentrate" is a by product of a water purification processes having a higher concentration of a solute or other material than the feed water, such as a brine by-product produced by a desalination process.

"Draw solution" is a solution having a relatively high osmotic potential that can be used to extract water through a semipermeable membrane from a solution having a relatively low osmotic potential. In certain embodiments, the draw solution may be formed by dissolving an osmotic agent in the draw solution.

"Receiving stream" is a stream that receives water by a water purification or extraction process. For example, in forward-osmosis, the draw solution is a receiving stream that receives water from a feed stream of water having a lower osmotic potential than the receiving stream.

"Product Water" is potable water produced by a system as described herein.

The terms "upstream" and "downstream" are used herein to denote, as applicable, the position of a particular component, in a hydraulic sense, relative to another component. For example, a component located upstream of a second component is located so as to be contacted by a hydraulic stream (flowing in a conduit for example) before the second component is contacted by the hydraulic stream. Conversely, a component located downstream of a second component is located so as to be contacted by a hydraulic stream after the second component is contacted by the hydraulic stream.

The disclosed systems and methods may be implemented in any suitable manner, which may depend on the particular application, including the scale of the application. The various components, such as heat exchangers and purification units, may be made of suitably non-reactive materials such as plastic, stainless steel, composite materials such as fiberglass, and glass. Liquid sources or other vessels may be, without limitation, cylindrical tanks, water towers, contoured tanks, or fitted tanks.

FIG. 1 illustrates a system 100 according to an embodiment of the present disclosure. A membrane-distillation unit 106 is in fluid communication with a feed stream of water 112 from a pump 116 and a permeate stream of water 120 from a permeate water source 124, such as a source of potable water. In particular examples, the membrane-distillation unit 106 is a vacuum enhanced membrane-distillation unit. Suitable membrane-distillation units and enhanced membrane units, and methods for their use, are described in U.S. provisional patent application 60/804,648 and U.S. Patent Publication 2006/0144788, each of which is incorporated by reference herein.

In operation, the feed stream 112 enters the membrane-distillation unit 106 on a feed side of a distillation membrane. Permeate water 120 is circulated on a permeate side of the distillation membrane. Water vapor passes through the distillation membrane into the permeate stream 120, which provides the product water steam 130.

The product water 130 may be collected in a product water storage or transport system 138 and put to beneficial use. A stream of concentrated feed water 134, such as a stream of concentrated brine, is also produced by the membrane-distillation water purification unit 106. The stream of concentrated feed water 134 is passed to a downstream membrane-distillation loop 142.

Additional product water can be extracted by the membrane-distillation loop 142. The membrane-distillation loop 142 includes a membrane-distillation desalination device 146 that is used to extract additional product water from the concentrated solution 134 produced by the desalination unit 106. The membrane-distillation desalination device 146 produces a product-water stream 150, which can be collected or transported by a product water system 154, which may be the same as system 138, and returns spent concentrated solution 160 to a forward-osmosis system 164.

The membrane-distillation device 146 is typically relatively insensitive to the salt concentration of the feed solution 134. Thus, the membrane-distillation device 146 can further increase overall recovery or flux of product water 150 from the system 100 and enhance the efficiency of later forward-osmosis processes.

In at least one embodiment, the membrane-distillation device 146 is an enhanced membrane-distillation desalination device that is able to produce relatively high flux across a membrane (not shown). In a particular implementation, the enhanced membrane-distillation desalination device is a direct-contact membrane-distillation device. In a more particular implementation, the enhanced membrane-distillation desalination device 146 uses an enhanced membrane-distillation method whereby vacuum is applied to a permeate side, and optionally a feed side, of a flow cell (not shown) containing the membrane to cause the stream to flow under vacuum or reduced pressure. The membrane-distillation device may be constructed as described for the unit 106.

The concentrated feed water 160 enters the downstream forward-osmosis system 164, where it is diluted using waste water, impaired water, sea water, or other suitable water source or industrial feed solution. The concentrated feed water 160 allows the forward-osmosis system 164 to act as a pretreatment for the waste water, impaired water, sea water, industrial feed solution, or other water source. In further embodiments, the membrane-distillation loop 142 is omitted and the stream 134 passes into the forward-osmosis system 164. Suitable forward-osmosis systems, and methods for their use, are described in U.S. provisional patent application 60/804,648 and U.S. Patent Publication 2006/0144789, each of which is incorporated by reference herein.

In the embodiment shown in FIG. 1, the forward-osmosis system 164 is a dual-stage forward-osmosis system which includes a first-stage forward-osmosis unit 168 including a first forward-osmosis membrane (not shown), and a second-stage forward-osmosis unit 172 including a second forward-osmosis membrane (not shown). The first-stage forward-osmosis unit 168 and the second-stage forward-osmosis unit 172 are arranged hydraulically in tandem in a hydraulic loop.

Although in this embodiment the forward-osmosis system 164 is depicted and described as a "two-stage" forward-osmosis system, it will be understood that this forward-osmosis system alternatively can include only one forward-osmosis unit or can include more than two forward-osmosis units. In addition, even though the forward-osmosis system 164 is shown and described with the forward-osmosis units being connected in tandem (in series), it will be understood that other interconnection schemes (including parallel connection schemes and/or combinations of parallel and series, as well as multiple forward-osmosis processes occurring in a single unit) can be used.

The concentrated stream 134 (or 160, if the membrane-distillation loop 142 is included) passes through the dual-stage forward-osmosis system 164, namely first through the first-stage forward-osmosis unit 168 and then through the second-stage forward-osmosis unit 172. As the concentrate 134 (160) passes through the first-stage forward-osmosis unit 168 on the permeate side of the membrane, seawater 178 (or other suitable impaired water) is circulated through the first-stage forward-osmosis unit 168 on the feed side of the membrane. As a result, the concentrate stream 134(160) is diluted by transfer of water from the feed side of the membrane. The concentrated brine 182 (or other concentrated solution) from the forward-osmosis unit 168 may be discharged from the first-stage forward-osmosis unit 168.

As the diluted concentrate 184 from the first-stage forward-osmosis unit 168 passes through the second-stage forward-osmosis unit 172 on the permeate side of the membrane, treated wastewater 186 (or other impaired water having a suitably low salinity or osmotic potential) is circulated through the second-stage forward-osmosis unit 172 on the feed side of the membrane. As a result, the diluted concentrate 184 is further diluted by transfer of water from the feed side of the membrane, thereby concentrating the wastewater 186, or impaired water, in a concentrate stream 188 that is discharged from the second-stage forward-osmosis unit 172. The brine 190 from the second-stage forward-osmosis unit 172, now further diluted, is, in some embodiments, routed to upstream of the pump 116, thereby completing the loop from downstream of the desalination unit 106 to upstream of it.

Passing the concentrate 134(160) through the two-stage forward-osmosis system 164 uses the concentrated brine 134 (160) from the membrane-distillation unit 106 to provide a source of water for desalination. Because forward-osmosis membranes and processes generally exhibit a low degree of fouling, forward-osmosis can be advantageously used in this embodiment for pretreating reclaimed water or impaired water for use in most desalination processes. This can eliminate other, more expensive, pretreatment steps as well as protect the desalination process.

In some implementations, including the system 100 of FIG. 1, the diluted concentrated feed stream 190 from the downstream forward-osmosis system 164 is in fluid communication with a concentrated feed stream buffer tank 192, such as a brine buffer tank. The buffer tank 192 may be used to adjust the osmotic potential, such as the salt concentration or feed volume, of the now diluted stream of concentrated feed water 190. For example, if the diluted stream of concentrated feed water 190 is not sufficiently concentrated by the membrane-distillation unit 106 to serve as a draw solution for the downstream forward-osmosis system 164, brine may be added to the feed water 134(160) from the brine buffer tank 192. The brine buffer tank 192 can accept excess concentrated feed water 134(160). In some implementations, the brine buffer tank 192 is located elsewhere in the system 100, such as intermediate the membrane-distillation unit 106 and the forward-osmosis system 164.

The diluted feed stream 194 from the brine buffer tank 192 is optionally in communication with a heater 196, such as a gas, electric, or solar heater. The stream 198 exiting the heater 196 passes to the pump 116. Heating the stream 198 prior to it entering the membrane-distillation unit 106 can aid product water flux in the membrane-distillation unit 106. In further embodiments, the heater 196 is located intermediate the pump 116 and the membrane-distillation unit 106. In embodiments where the brine buffer tank 192 is omitted, the stream 190 from the forward-osmosis system 164 may optionally be in fluid communication with the heater 196.

Figure 2:
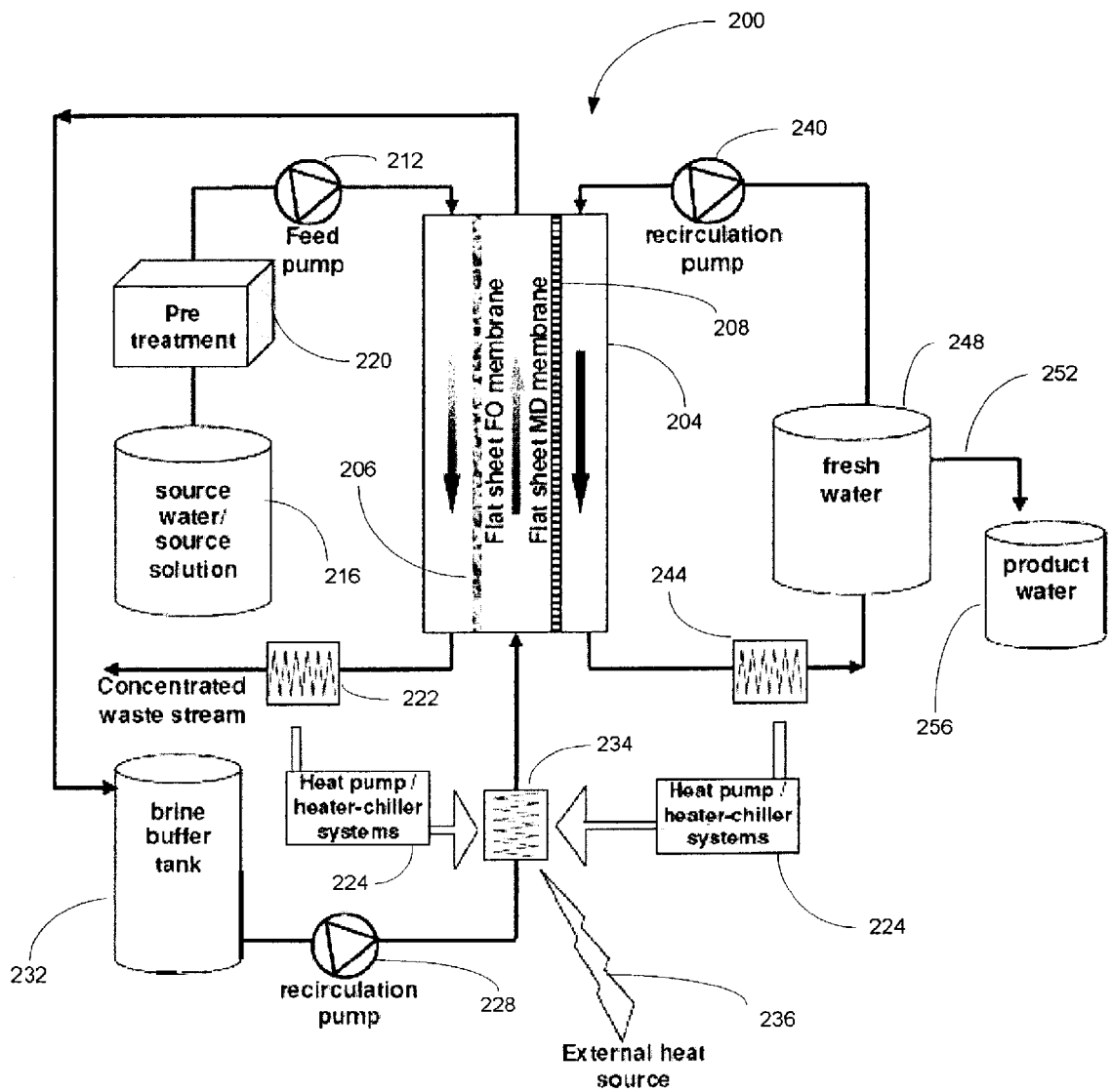
FIG. 2 is a diagram illustrating a unitary membrane-distillation/forward-osmosis flow cell useable in the water-treatment system of FIG. 1.

FIG. 2 presents an implementation of the system 100 of FIG. 1 where a membrane-distillation unit and a forward-osmosis system are combined into a single flow cell design.

In the system 200, a flow cell 204 contains a forward-osmosis membrane 206 and a membrane-distillation membrane 208. A feed recirculation pump 212 pumps source water 216, such as seawater, brackish water, impaired water, an industrial solution, or other suitable feed source into the feed side of the forward-osmosis membrane 206. The feed water 216 is optionally pretreated by a treatment process 220, such as coagulation, media filtration, microfiltration, ultrafiltration, beach wells, ion-exchange, chemical addition, disinfection, or other membrane process, in any suitable combination and/or order.

The concentrated feed solution leaving the flowcell 204 may be cooled with a heat exchanger 222, or other suitable cooling unit, and the heat recovered can be transferred by a heat pump 224 to the intermediate brine stream. A recirculation pump 228 pumps a draw solution, such as concentrated brine, onto the draw side of the forward-osmosis membrane 206. A brine buffer tank 232 and a heater 234 are in communication with the concentrated brine solution. The buffer tank 232 is omitted in some implementations.

The draw solution serves a feed water on a feed side of the membrane-distillation membrane 208 and is circulated and heated by the recirculation pump 228 and the heater 234. Energy for heater 234 can be from an external source 236 or from heat pumps 224 that recover waste heat in the system 200.

A permeate solution is circulated on a permeate side of the membrane-distillation membrane 208 using a recirculation pump 240. The permeate solution is in communication with a heat exchanger 244 (which may be the same as heat exchanger 222) or other suitable cooling device. The heat exchanger 244 may be in communication with the heater 236 (or another heater) or the heat pump 224 (or another heat pump). The permeate solution is in communication with a permeate water tank 248, which produces a stream of product water 252 that may be stored or transported using a product water system 256.

It may be desirable to post-treat one or more product waters 252. The particular nature of the post-treatment may depend on the use of the product water. In one implementation, the product water 252 can be subjected to one or more of pH adjustment (such as by suitable titration), chlorination, ozonation, UV irradiation, ion exchange, activated-charcoal adsorption, or the like.

The disclosed systems and methods may provide a number of benefits. For example, the combination of a membrane-distillation unit (such as 106 or 204) and the downstream or parallel forward-osmosis system (such as 164 or 204) can allow complex water streams to be treated. For example, the forward-osmosis systems 164, 204 may be used to remove inorganic salts and organic compounds that do not cross the membrane from a water source. The membrane-distillation unit 106, 204 may be used to remove components that cross the forward-osmosis membranes. For example, when the water to be treated contains urea or specific emerging contaminants such as hormones or endocrine desrupting compounds, the membrane-distillation unit 106, 204 is used to remove urea and the other compounds, while the forward-osmosis system 164, 204 is used to removed inorganic salts and other organic compounds. The inclusion of a membrane-distillation unit with a forward-osmosis system is also beneficial as membrane-distillation units, unlike forward-osmosis systems, are relatively insensitive to the salt concentration in the feed stream.

Figure 3:
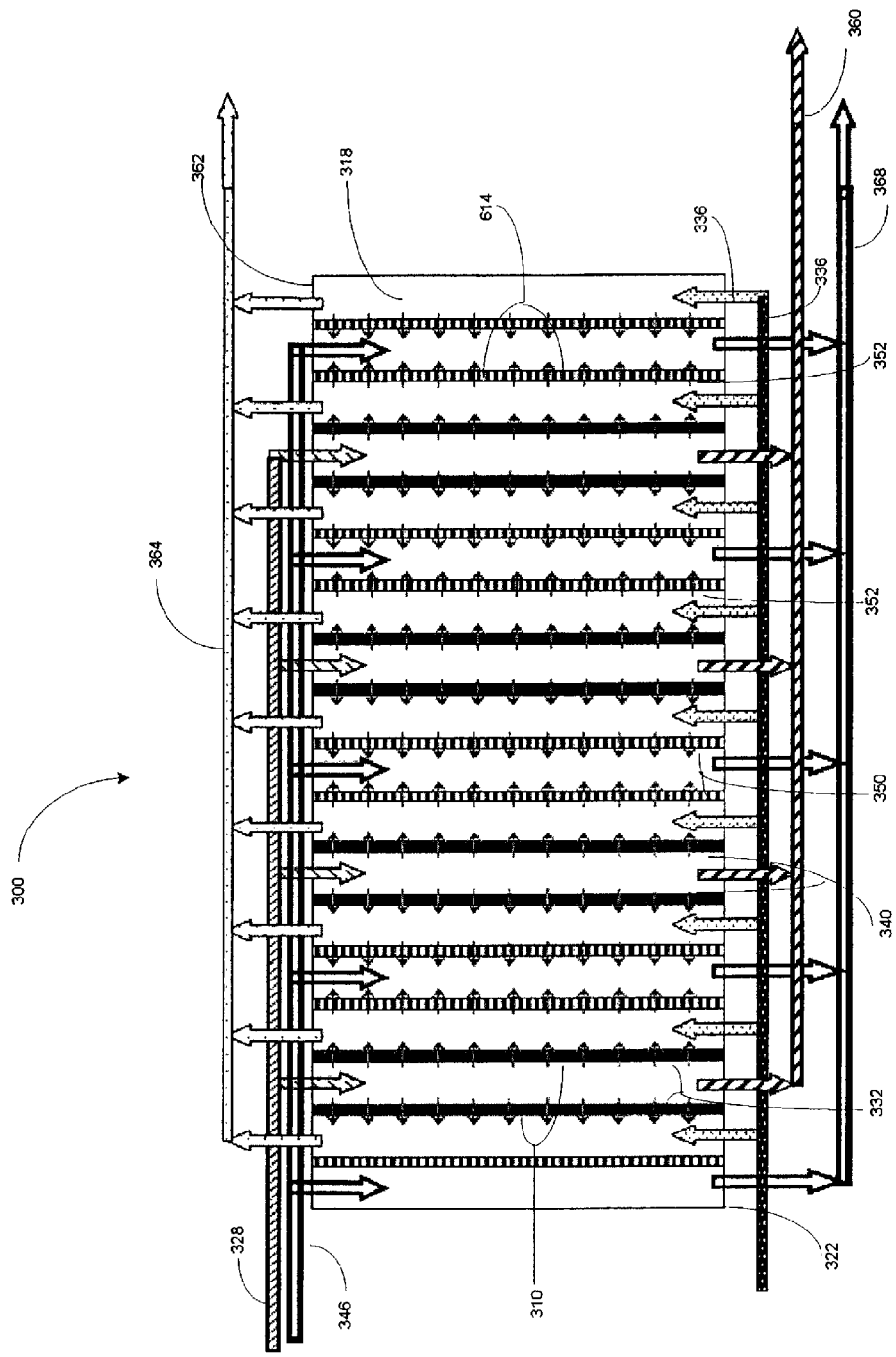
FIG. 3 is a diagram illustrating a particular example of a flow cell useable in the system of FIG. 2.

The system 200 in FIG. 2 may use alternative flow cell configurations. For example, FIG. 3 illustrates a flow cell 300 having a plate and frame configuration. Multiple forward-osmosis membranes 310 and membrane-distillation membranes 314 are distributed in pairs throughout a cavity 318 defined by opposing plates 322. A source water line 328, such as a line providing sea water, an impaired water, an industrial solution, or other water source, is in communication with a feed solution side 332 of each of a pair of forward-osmosis membranes 310. The water in the source water line 328 may be cooled by a suitable cooling source (now shown), such as a heat exchanger. A draw solution line 336 provides draw solution, such as concentrated brine, to a draw solution side 340 of the forward-osmosis membranes 310. The draw solution may be heated by a suitable heating device (not shown). The draw solution may also be in contact with a brine/draw solution buffer tank (not shown), as previously described. A permeate water line 346, which may carry pure water, for example, is in communication with a permeate side 350 of each of a pair of membrane-distillation membranes 314. The water in the permeate water line 346 may be cooled by a suitable cooling source (not shown), such as a heat exchanger.

During operation of the flow cell 300, the draw solution circulating on the draw side 340 of a forward-osmosis membrane draws water from a feed solution circulated on the feed side 332 of a forward-osmosis membrane 310. At the same time, the draw solution circulates on a feed side 354 of a membrane-distillation membrane 314. Water is distilled through the membrane-distillation membrane 314 into the permeate stream circulating on the permeate side 350 of the membrane distillation membrane 314. A temperature difference may be maintained between the permeate stream and the feed stream to aid flux of product water into the permeate stream.

Figure 4:
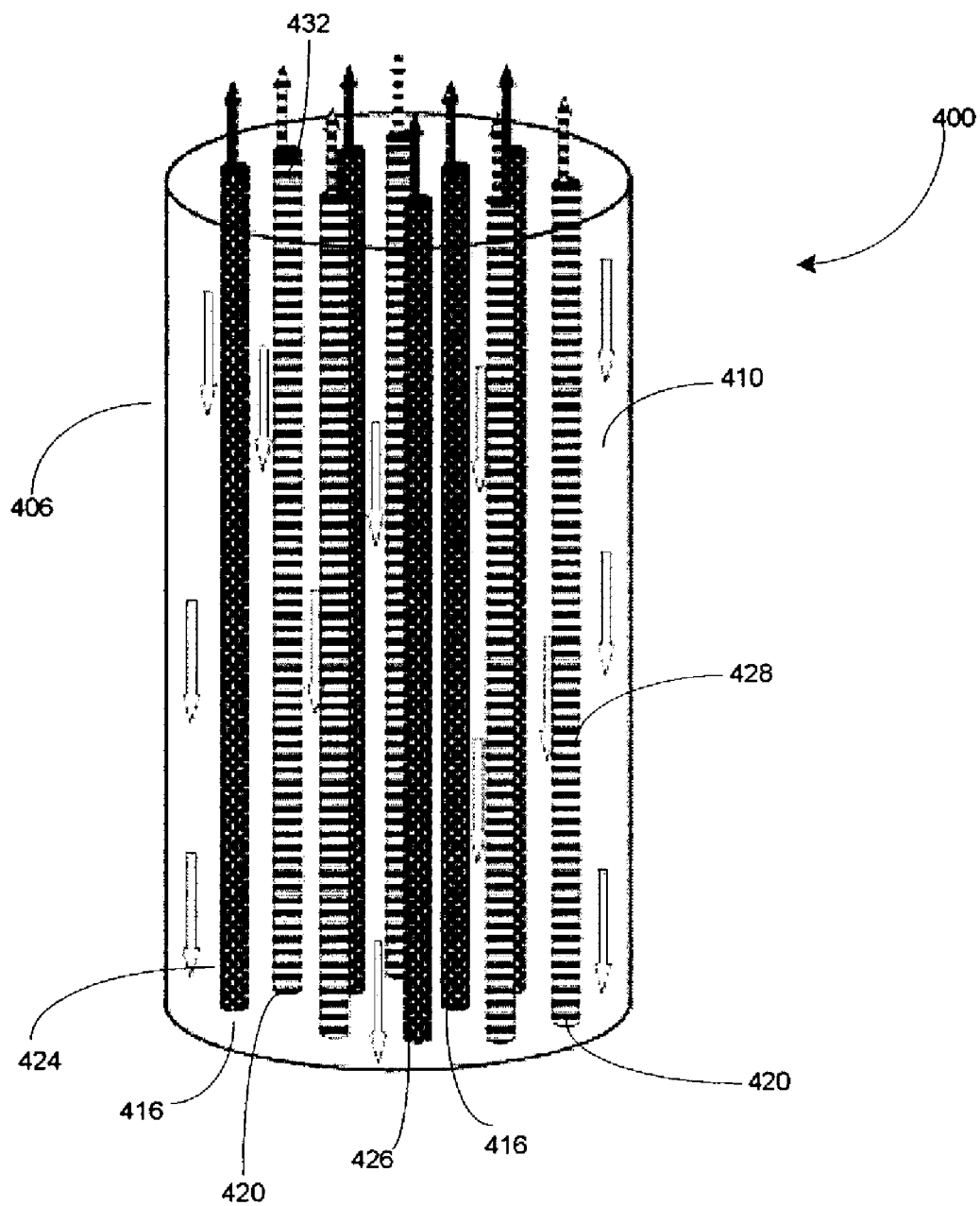
FIG. 4 is a diagram illustrating a particular example of a flow cell useable in the system of FIG. 2.

FIG. 4 illustrates an additional flowcell 400 useable in the embodiment of FIG. 2. The flowcell 400 includes a cylindrical shell 406. A draw solution, such as concentrated brine, is introduced into a central cavity 410 of the cylindrical shell. The draw solution may be heated, as previously described.

A plurality of cylindrical forward-osmosis membranes 416 and membrane-distillation membranes 420 are disposed in the central cavity 410, coaxial (or, in other embodiments, perpendicularly) with the cylindrical shell 406. The side of the forward-osmosis membrane 416 facing the cavity 410 constitutes a draw side 424 of the forward-osmosis membrane. The inner surface (bore side) of the forward-osmosis membrane 416 constitutes a feed side of the forward-osmosis membrane 416 and is communication with a feed solution, as previously described. The outer surface of the membrane-distillation membrane 420 constitutes a feed side 428 of the membrane-distillation membrane 420. The inner surface (bore side) of the membrane-distillation membrane 420 constitutes a permeate side 432 of the membrane-distillation membrane 420 and is communication with a permeate solution, as previously described. The membranes 416 and 420 may be of any suitable membrane type, such as hollow-fiber, capillary, or tubular membranes. The draw solution fills the cavity 410 and contacts the outer surfaces of the forward-osmosis membranes 416 and the membrane-distillation membranes 420. The feed, draw, and permeate solutions may be heated or cooled as previously described. In addition, the draw solution may be in communication with a draw solution/brine buffer tank.

In operation, the draw solution in the cavity 410 draws water from the feed water passing through the forward-osmosis membrane 416. Water vapor from the draw solution passes through the membrane-distillation membranes 420 and is received by the permeate stream. Of course, the flow cell 400 and membranes 416, 420 may be shaped, oriented, and placed other than as shown in FIG. 4. For example, the membranes 416, 420, in other examples, are not cylindrical.

It will be understood that the methods and systems of the present disclosure can be used for purposes other than desalination of seawater or of impaired water. Such systems and methods can be used for treating raw wastewater to drinking-water level, treatment of landfill leachates, and in the food, chemical industry, pharmaceutical, or biotechnological industries. In particular implementations, more than 97% of the total nitrogen and more than 99.5% of the phosphorus in the feed solution are rejected by the disclosed systems.

It is to be understood that the above discussion provides a detailed description of various embodiments. The above descriptions will enable those skilled in the art to make many departures from the particular examples described above to provide apparatus constructed in accordance with the present invention. The embodiments are illustrative, and not intended to limit the scope of the present invention. Changes may be made in the construction and operation of the various components, elements and assemblies described herein and changes may be made in the steps or sequence of steps of the methods described herein. For example, although the present disclosure generally describes methods of purifying water, the disclosed methods and systems may be used to purify other liquids, such as a solvent in a mixed solvent system, to remove contaminants from a liquid, or to concentrate feed streams, such as liquid foods or chemical or biological solutions/suspensions in chemical or biological or pharmaceutical industries. The scope of the present invention is rather to be determined by the scope of the claims as issued and equivalents thereto.

What is claimed is:

1. A water extraction system comprising:
   a flow cell comprising a plurality of forward-osmosis membranes and a plurality of membrane distillation membranes, the forward-osmosis membranes comprising a feed side and a draw side, the membrane-distillation membranes comprising a feed side and a permeate side;
   a housing, the flow cell located in the housing;
   a permeate solution in communication with the permeate sides of the membrane distillation membranes;
   a source water in fluid communication with the feed sides of the forward-osmosis membranes; and
   a draw solution in communication with the draw sides of the forward osmosis membranes and the feed sides of the membrane distillation membranes;
   wherein the plurality of forward-osmosis and membrane-distillation membranes are arranged in pairs and source water is introduced on the feed sides of the forward-osmosis membranes, permeate solution is introduced on the permeate sides of the membrane-distillation membranes, and draw solution is introduced between the membrane-distillation and forward-osmosis membranes.

2. The system of claim 1, further comprising a draw solution buffer tank in communication with the draw solution.

3. The system of claim 1, further comprising a first vacuum pump in communication with the permeate solution.

4. The system of claim 3, further comprising a second vacuum pump in communication with the draw solution.

5. The system of claim 1, further comprising a heater in communication with the draw solution.

* * * * *